US011354259B1

(12) United States Patent
Hilland et al.

(10) Patent No.: US 11,354,259 B1
(45) Date of Patent: Jun. 7, 2022

(54) COMPUTER SYSTEM CONFIGURATIONS BASED ON ACCESSING DATA ELEMENTS PRESENTED BY BASEBOARD MANAGEMENT CONTROLLERS

(71) Applicant: HEWLETT PACKARD ENTERPRISE DEVELOPMENT LP, Houston, TX (US)

(72) Inventors: Jeffrey R. Hilland, Lago Vista, TX (US); Jeffrey S. Autor, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/114,654

(22) Filed: Dec. 8, 2020

(51) Int. Cl.
*G06F 13/20* (2006.01)
*G06F 9/4401* (2018.01)
*G06F 13/16* (2006.01)

(52) U.S. Cl.
CPC ............ *G06F 13/20* (2013.01); *G06F 9/4406* (2013.01); *G06F 13/1668* (2013.01)

(58) Field of Classification Search
CPC ..... G06F 13/20; G06F 13/1668; G06F 9/4406
See application file for complete search history.

(56) References Cited

U.S. PATENT DOCUMENTS

| 8,260,841 | B1 * | 9/2012 | Maity ................... G06F 3/0664 709/202 |
| 8,965,749 | B2 | 2/2015 | Sakthikumar et al. |
| 9,043,776 | B2 | 5/2015 | Guo et al. |
| 9,806,959 | B2 | 10/2017 | Christopher et al. |
| 10,467,015 | B2 * | 11/2019 | Dasar .................... G06F 9/4401 |
| 10,474,606 | B2 * | 11/2019 | Emerson ................ G06F 13/28 |
| 10,503,489 | B1 * | 12/2019 | Lin ........................... G06F 8/65 |
| 2014/0298003 | A1 * | 10/2014 | Ali ....................... G06F 9/45558 713/2 |
| 2016/0371107 | A1 * | 12/2016 | Puthillathe .......... G06F 9/45558 |
| 2017/0249133 | A1 * | 8/2017 | Herzi .................... G06F 9/4403 |
| 2018/0052793 | A1 * | 2/2018 | Fang .................... H04L 45/745 |
| 2019/0197261 | A1 | 6/2019 | Yu et al. |
| 2020/0104141 | A1 | 4/2020 | Balakrishnan et al. |

OTHER PUBLICATIONS

DMTF, Redfish Specification, Document Identifier: DSP0266, Date: May 16, 2019, Version: 1.7.0 (102 pages).
DMTF, Security Protocol and Data Model (SPDM) over MCTP Binding Specification, Document Identifier: DSP0275, Date: Dec. 22, 2019, Version: 1.0.0 (11 pages).

(Continued)

*Primary Examiner* — Henry Tsai
*Assistant Examiner* — Christopher A Daley
(74) *Attorney, Agent, or Firm* — Trop, Pruner & Hu, P.C.

(57) ABSTRACT

In some examples, a baseboard management controller (BMC) includes a communication interface to communicate with a device over a network; and a processor to present a virtual input/output (I/O) device that stores a hierarchical structure of data elements, write information in a first data element of the data elements, the information relating to a configuration of a computer system to be managed by the BMC, and receive an access of the first data element during a configuration stage of the computer system.

20 Claims, 4 Drawing Sheets

(56) References Cited

OTHER PUBLICATIONS

DMTF, Security Protocol and Data Model (SPDM) Specification, Document Identifier: DSP0274, Date: Oct. 18, 2019, Version: 0.99.0a (58 pages).
iDRAC9 with Lifecycle Controller Version 3.15.15.15 (Research Paper), Jun. 2018, 107 Pgs.
USB 3.0 Promoter Group, Universal Serial Bus Security Foundation Specification, Revision 1.0 with ECN and Errata through Jan. 7, 2019 (27 pages).
USB 3.0 Promoter Group, Universal Serial Bus Type-C™ Authentication Specification, Revision 1.0 with ECN and Errata through Jan. 7, 2019 (53 pages).
Wikipedia, cURL last edited on Nov. 10, 2020 (6 pages).
Wikipedia, PCI Express last edited on Nov. 7, 2020 (31 pages).
Wikipedia, Redfish (specification) last edited on Oct. 21, 2020 (5 pages).
Wikipedia, Representational state transfer last edited on Nov. 7, 2020 (8 pages).
Wikipedia, Trusted Platform Module last edited on Oct. 5, 2020 (18 pages).
Wikipedia, USB last edited on Nov. 5, 2020 (32 pages).

\* cited by examiner

COMPUTER SYSTEM CONFIGURATIONS BASED ON ACCESSING DATA ELEMENTS PRESENTED BY BASEBOARD MANAGEMENT CONTROLLERS

BACKGROUND

Configuration operations of a computer system can be performed using a baseboard management controller (BMC). The BMC is remotely accessible by a remote computer over a network. The remote computer can modify settings of the computer system by interacting with the BMC.

BRIEF DESCRIPTION OF THE DRAWINGS

Some implementations of the present disclosure are described with respect to the following figures.

Figure 1:
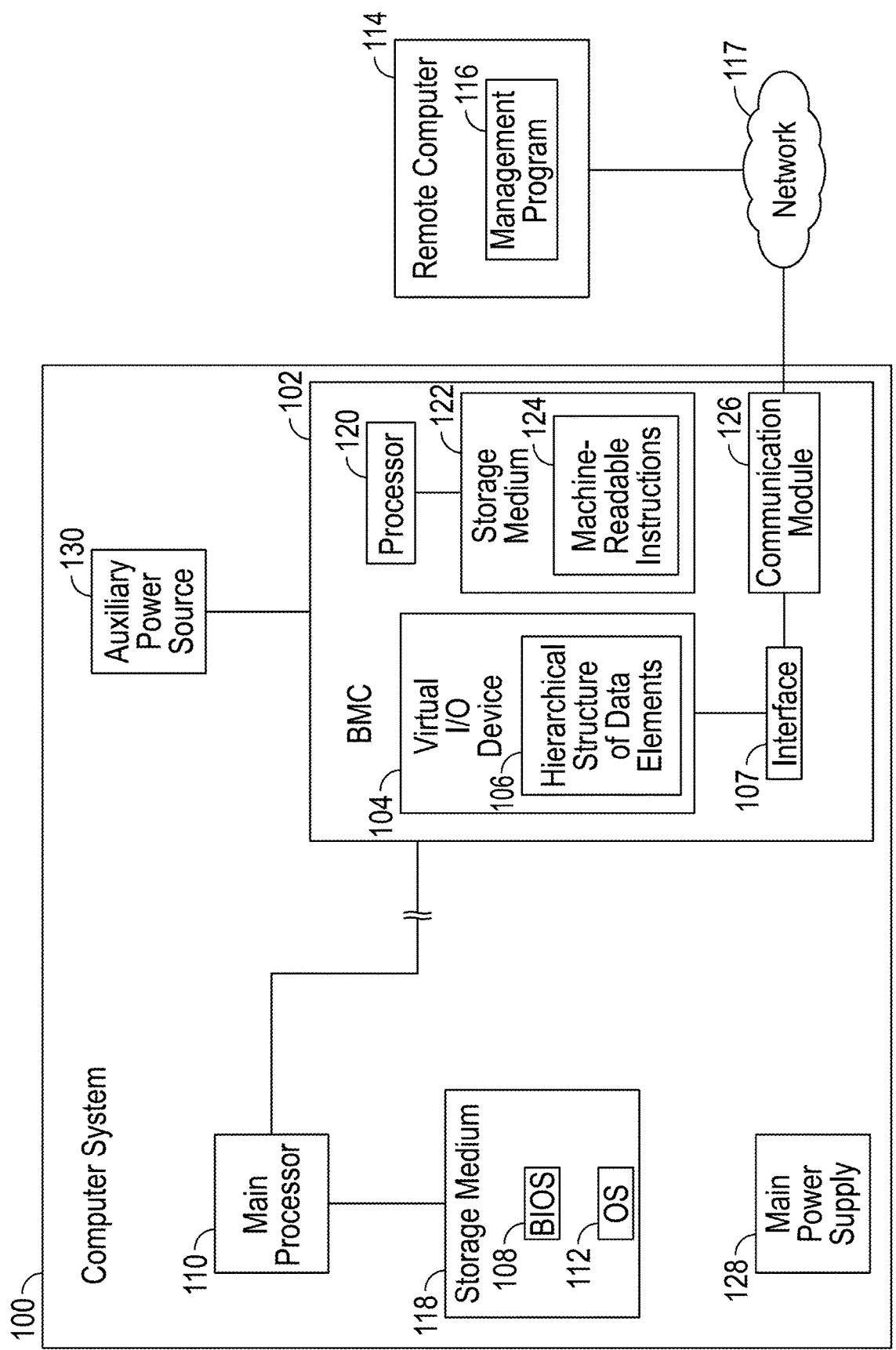
FIG. 1 is a block diagram of an arrangement that includes a computer system with a baseboard management controller (BMC) usable to perform a configuration of the computer system according to some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A BMC is an example of a management controller that is separate from a main processor of a computing system. As used herein, a "BMC" is a specialized service controller that monitors the physical state of the computing system using sensors and communicates with a remote management system (that is remote from the computing system) through an independent "out-of-band" connection.

The BMC has management capabilities to manage components of the computing system. Examples of management capabilities of the BMC can include any or some combination of the following: power control to perform power management of the computing system (such as to transition the computing system between different power consumption states in response to detected events), thermal monitoring and control of the computing system (such as to monitor temperatures of the computing system and to control thermal management devices of the computing system), fan control of fans in the computing system, system health monitoring based on monitoring measurement data of various sensors of the computing system, remote access of the computing system (to access the computing system over a network, for example), remote reboot of the computing system (to trigger the computing system to reboot using a remote command), system setup and deployment of the computing system, system security to implement security procedures in the computing system, and so forth.

In some examples, the BMC can provide so-called "lights-out" functionality for computing systems. The lights out functionality may allow a user, such as a systems administrator, to perform management operations on the computing system even if the OS is not installed or not functional on the computing system.

Moreover, in some examples, the BMC can run on auxiliary power provided by an auxiliary power supply (e.g., a battery); as a result, the computing system does not have to be powered on to allow the BMC to perform the BMC's operations. The auxiliary power supply is separate from a main power supply that supplies powers to other components (e.g., the main processor, etc.) of the computing system.

To perform a configuration of a computer system, firmware (including machine-readable instructions) of the computer system can read information from and/or write information to a BMC. Examples of firmware include a Basic Input/Output System (BIOS), which performs boot operations of the computer system. Boot operations include testing and initializing hardware components of the computer system, starting a boot loader, starting an operating system (OS), and so forth. As used here, reference to "BIOS" also includes reference to Unified Extensible Firmware Interface (UEFI) firmware.

Firmware reading information from and writing information to the BMC can create a security hole. For example, the firmware may be compromised, such as due to corruption of the firmware by malware or due to introduction of an unauthorized firmware by an unauthorized source (e.g., a hacker or another entity). The compromised firmware can then access secret information (such as information relating to settings of the computer system, etc.) or can maliciously modify information in the BMC, such as to change the configuration of the computer system to operate in an unintended manner. The security hole may be created due to the fact that the mechanism used to read and write information to the BMC for purposes of configuring the computer system may become accessible by an unauthorized entity, such as based on compromising the firmware or in another way.

In accordance with some implementations of the present disclosure, a secure interface is provided to allow the firmware to read and write information of the BMC for purposes of configuring a computer system.

FIG. 1 shows an example computer system 100. The computer system 100 can include a single computing device or multiple computing devices (e.g., multiple server computers in a rack, data center, cloud environment, etc.). In examples according to FIG. 1, the computer system 100 includes a BMC 102. Although FIG. 1 shows the BMC 102 as being included in the computer system 100 (e.g., contained in a chassis of the computer system 100 along with the computing device(s) of the computer system 100), in other examples, the BMC 102 may be separate from but communicatively coupled to the computer system 100 over a communication link (wired or wireless link).

In accordance with some implementations of the present disclosure, the BMC 102 is able to present a virtual input/ output (I/O) device 104 that stores a hierarchical structure of data elements 106. The virtual I/O device 104 is part of the secure interface that allows firmware to access information of the BMC 102 for configuring the computer system 100. The interface is made secure based on the following (discussed further below): (1) access to the hierarchical structure of data elements 106 stored by the virtual I/O device 104 by entities in the computer system 100 is disabled after boot time, and (2) communications between the firmware and the BMC 102 is protected by a security protocol.

In some examples, the hierarchical structure of data elements 106 can be associated with a RESTful application programming interface (API) according to a REpresentational State Transfer (REST) protocol. More generally, the hierarchical structure of data elements 106 can be associated with an interface 107 (e.g., the RESTful interface or another type of interface) that allows access (read or write access) of the hierarchical structure of data elements 106 (or a portion less than the entirety of the hierarchical structure of data elements 106) by another entity, such as a management program 116 in a remote computer 114. In other examples, instead of using a RESTful interface, the interface 107 can be accessible by another entity using gRPC Remote Procedure Calls, Protocol Buffers (Protobuf), and so forth.

In some examples, the data elements of the hierarchal structure of data elements 106 can be in the form of files referred to by Uniform Resource Identifiers (URIs). Thus, the management program 116 can interact with the data elements of the hierarchical structure of data elements 106 using URIs corresponding to the data elements in the hierarchical structure of data elements 106. In some examples, the hierarchal structure of data elements 106 presented by the virtual I/O device 104 can be in the form of a file system, which includes a hierarchical arrangement of files and directories, where the files can contain the pages referred to by the URIs.

By presenting the virtual I/O device 104, firmware such as a BIOS 108 in the computer system 100 is able to perform reads and writes of information in the hierarchical structure of data elements 106 stored by the virtual USB device 104. In some examples, the virtual I/O device 104 is in the form of a virtual mass storage device, such as a disk drive, a solid-state drive, a random access memory (RAM), a persistent memory, and so forth. In such examples, the hierarchical structure of data elements 106 can be accessed by the BIOS 108 using mass storage device reads and writes.

Inside the computer system 100, the hierarchical structure of data elements 106 are accessible based on read and write accesses of the virtual I/O device 104, such as by the BIOS 108. Outside the computer system 100, the hierarchical structure of data elements 106 are accessible using the interface 107.

The virtual I/O device 104 is created by the BMC 102, and remains under the control of the BMC 102. The virtual I/O device 104 is created by the machine-readable instructions 124 of the BMC 102, and the BMC 102 exposes the virtual I/O device 104 to an entity, such as the BIOS 108 in the computer system 100.

A "virtual I/O device" can refer to an I/O device that is emulated by machine-readable instructions 124 (e.g., firmware and/or software) executed by the BMC 102. A "virtual mass storage device" refers to a mass storage device emulated by the machine-readable instructions 124 executed by the BMC 102.

In some examples, the virtual I/O device 104 can be a virtual Universal Serial Bus (USB) device, which is a USB device emulated by the machine-readable instructions 124 executed by the BMC 102. The virtual USB device can be a virtual USB mass storage device. A virtual USB mass storage device is an emulated mass storage device that communicates according to USB (e.g., reads and writes are performed according to USB). USB is an industry standard that defines specifications for the connection, communication, and supply of power between computers and peripheral devices.

In other examples, the virtual I/O device 104 is a virtual Peripheral Component Interconnect Express (PCIe) device, such as a virtual PCIe mass storage device. PCIe is a serial expansion bus standard that defines a protocol governing communications over a computer or I/O bus. Other examples of I/O buses include an Inter-Integrated Circuit (I2C) bus, a Computer Express Link (CXL) bus, a Gen-Z bus, and so forth.

In further examples, the virtual I/O device 104 can interact with the BIOS 108 (or another entity of the computer system 100) using other protocols, whether standardized, open source, or proprietary.

Information relating to a configuration of the computer system 100 can be written to the hierarchical structure of data elements 106, so that the information can be accessed during a configuration stage of the computer system 100, such as during a boot operation performed by a BIOS 108. A "configuration stage" can refer to a phase of an operation of the computer system 100 during which a setting of the computer system 100 can be specified. Example settings are set forth below. The information written to the hierarchical structure of data elements 106 can include a setting of the BIOS 108, a setting that controls a boot order of different types of storage devices in the computer system 100 (e.g., when booting, the computer system 100 may attempt to boot using firmware in a first type of storage device, and if unsuccessful, attempt to boot using firmware in a second type of storage device, and so forth), a setting of a secure cryptoprocessor (e.g., a Trusted Platform Module (TPM)) that performs cryptographic operations for secure operations (a secure cryptographic processor is a dedicated processor separate from the main processor 110 for performing cryptographic operations and that is embedded in packaging with tamper resistance), a setting of a user input device (e.g., whether numeric lock or Num Lock is activated on a keyboard, a setting of a mouse input device, a setting of a touchscreen device, etc.), or any other setting that affects an operation of the computer system 100.

The interface between the BIOS 108 and the BMC 102 can be a secure interface. For example, communications between the BIOS 108 and the BMC 102 can be according to a Security Protocol and Data Model (SPDM) over Management Component Transport Protocol (MCTP), as defined by the Distributed Management Task Force (DMTF). In examples where the virtual I/O device 104 is a virtual USB device, then communications between the BIOS 108 and the BMC 102 can be according to SPDM over MCTP over USB. In other examples, the secure interface between the BIOS 108 and the BMC 102 can be according to USB Authentication, such as according to the Universal Serial Bus Type-C™ Authentication Specification. In other examples, other types of secure interfaces can be employed between the BIOS 108 and the BMC 102.

By using a secure interface between the BIOS 108 and the BMC 102, information exchanged between the BIOS 108 and the BMC 102 is protected against eavesdropping or another type of unauthorized access.

In some examples, the hierarchical structure of data elements 106 arranges data elements in the form of a tree, where the data elements in the tree can represent respective resources of the computer system 100, such as the BIOS 108, an operating system (OS) 112, a storage device (e.g., a storage device of a storage medium 118), a network interface controller (not shown), a memory (not shown), a main processor 110, and so forth. Each data element that represents a respective resource of the computer system 100 can have a corresponding schema that defines a format of the information corresponding to the represented resource.

In some examples, the data elements arranged in a tree hierarchy can be according to the Redfish standard, which refers to a collection of specifications for the management of computer systems, storage systems, networking nodes, and so forth. Redfish uses RESTful interface semantics to access a schema-based data model (defining the data elements of the hierarchical structure of data elements 106, for example) to conduct management operations.

In some examples, the management program 116 (including machine-readable instructions) executed in the remote computer 114 can use Redfish to perform management of the computer system 100. The remote computer 114 can be coupled to the computer system 100 over a network 117. The network 117 can include a public network such as the Internet, a local area network (LAN), a wide area network (WAN), a storage area network (SAN), or another type of network, whether wired or wireless.

The management program 116 executed in the remote computer 114 can perform remote management of the computer system 100 through the BMC 102. More specifically, the management program 116 can use the interface 107 to access the hierarchical structure of data elements 106. The management program 116 can be in the form of a web browser, a script (e.g., a client URL (Uniform Resource Locator) (cURL) script or another type of script), or any other type of program.

An example configuration operation can involve the BIOS 108 reading the hierarchical structure of data elements 106, configuring the computer system 100 according to configuration setting(s) in the hierarchical structure of data elements 106, and writing a changed configuration setting (which may have changed for any reason) to a given data element of the hierarchical structure of data elements 106. The configuration setting written to the given data element can be read by the management program 116. The management program 116 can then modify the configuration setting, such as in response to a user input or input from another source. The management program 116 can write the modified setting back to given data element of the hierarchical structure of data elements 106, which can occur outside of or during a boot operation of the computer system 100. Later, in a next boot operation, the BIOS 108 can read the hierarchical structure of data elements 106 (which can include the modified setting) for use in a configuration stage (e.g., during a boot operation) of the computer system 100.

As shown in FIG. 1, the storage medium 118 of the computer system 100 can store various machine-readable instructions, such as the BIOS 108, the OS 112, and so forth. The storage medium 118 can be implemented using a storage device or multiple storage devices, such as a disk-based storage device, a solid-state drive, a memory device, and so forth.

The machine-readable instructions stored in the storage medium 118, including the BIOS 108 and the OS 112, can be loaded for execution by the main processor 110 of the computer system 100.

A processor can include a microprocessor, a core of a multi-core microprocessor, a microcontroller, a programmable integrated circuit, a programmable gate array, or another hardware processing circuit. A "main" processor can refer to a processor that is used to execute certain machine-readable instructions of the computer system 100, including the BIOS 108, the OS 112, an application program, and so forth.

The BMC 102 includes a processor 120 that is separate from the main processor 110. More specifically, the BMC 102 is separate from the main processor 110.

The BMC 102 includes a storage medium 122 that stores the machine-readable instructions 124 that are executable on the processor 120 of the BMC 102. The machine-readable instructions 124 can include firmware and/or software of the BMC 102.

The BMC 102 further includes a communication module 126 to allow the BMC 102 to communicate over the network 117, such as with the remote computer 114. The communication module 126 can include a transceiver to transmit and receive signals and/or messages over the network 117, as well as any protocol layers that support various communication protocols for communication of information over the network 117.

The remote computer 114 can access the hierarchical structure of data elements 106 over the network 117 through the communication module 126 and using the interface 107.

The computer system 100 includes a main power supply 128, which supplies power to electronic components of the computer system 100, including the main processor 110, the storage medium 118, the BMC 102, and so forth. For example, the main power supply 128 can convert a voltage of an external power source, such as an AC power source, to internal power supply voltages for the electronic components of the computer system 100.

The BMC 102 is further powered by an auxiliary power source 130 of the computer system 100. The auxiliary power source 130 can include a battery or another backup power source that can continue to supply power to the BMC 102 even if the computer system 100 is turned off, and the main power supply 128 is inactive.

While powered by the auxiliary power source 130, the BMC 102 can continue to operate, such as by interacting with the remote computer 114 to perform management operations of the computer system 100.

Figure 2:
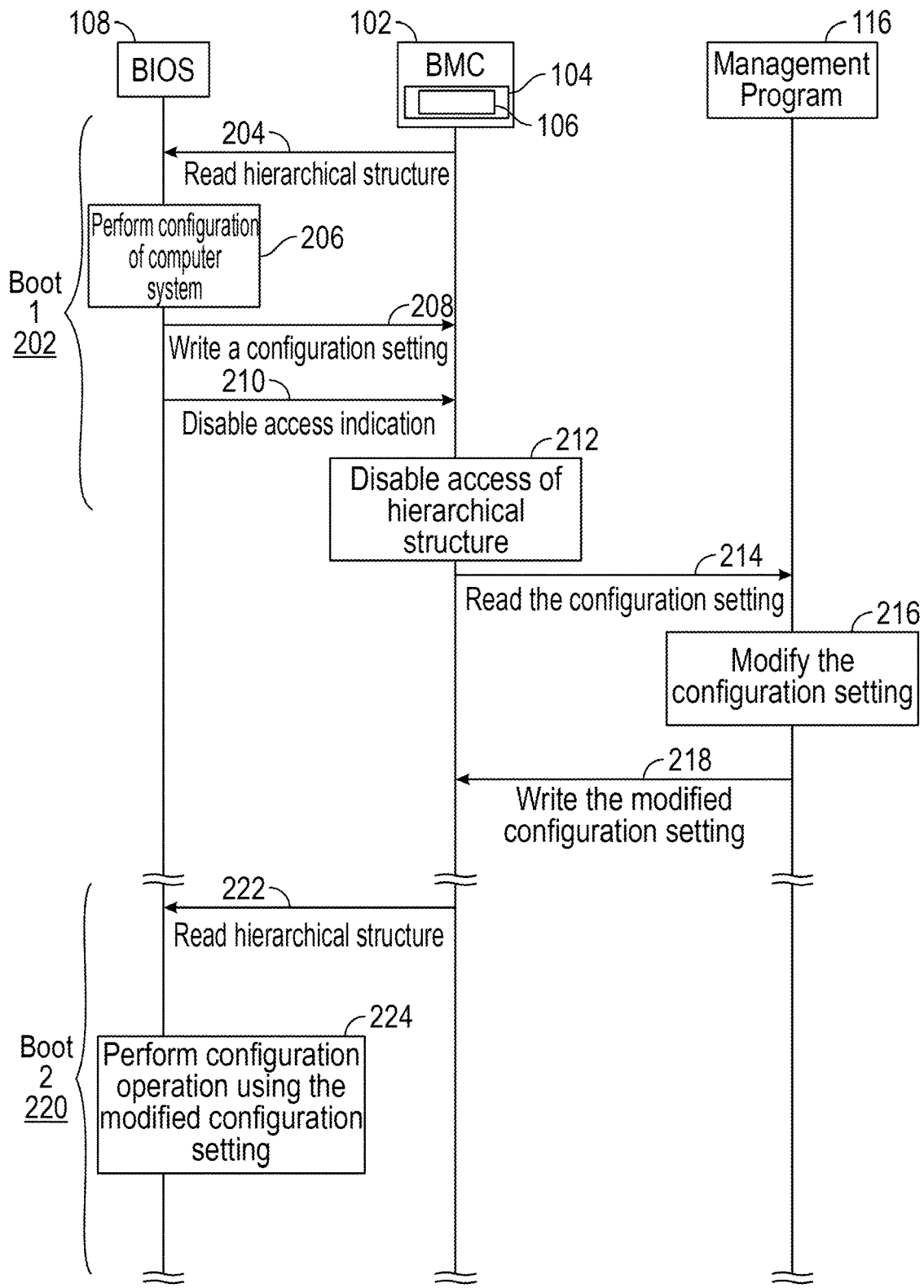
FIG. 2 is a flow diagram of a configuration process according to some examples.

FIG. 2 is a flow diagram of an example process that can be performed by the BIOS 108, the BMC 102, and the management program 116. In other examples, a process of the BIOS 108, the BMC 102, and the management program 116 can include additional or alternative tasks, and/or the tasks of FIG. 2 can be performed in a different order.

During a boot operation 202, the BIOS 108 (when executed on the main processor 110) may perform a configuration of the computer system 100 due to a change. The BIOS 108 reads (at 204) the hierarchical structure of data elements 106 stored at the virtual I/O device 104 of the BMC 102. The BIOS 108 performs (at 206) a configuration operation of the computer system 100 based on the configuration setting(s) of the hierarchical structure of data elements 106 read by the BIOS 108. The configuration performed by the BIOS 108 may involve a setting change due to a resource (e.g., a hardware electronic component, a program, etc.) being added or removed in the computer system 100, or due to a resource being modified. As another example, a user may have provided an indication that a configuration of the computer system 100 should be changed. As a further example, a fault or error of a resource of the computer system 100 may have led to the configuration change. There may be other events that may trigger the change of a configuration of the computer system 100.

A "boot operation" refers to an operational phase of the computer system 100 when the computer system 100 first starts, such as from a powered off state or another low power state in which some electronic components of the computer system 100 are powered off. A boot operation when the BIOS 108 performs a specified task, such as starting the OS 112 for execution on the main processor 110.

For example, the configuration operation can change a setting of the BIOS 108, change a boot order of different types of storage devices in the computer system 100, change a setting of a TPM in the computer system 100, change a setting of a user input device, and/or change another setting.

As part of performing the configuration or for another reason, a configuration setting may change, in which case the BIOS 108 may write (at 210) the configuration setting that has changed to a given data element of the hierarchical structure of data elements 106 stored in the virtual I/O device 104 of the BMC 102. For example, if the virtual I/O device 104 is a virtual mass storage device, then the write at 206 can be performed using a mass storage device write command issued by the BIOS 108 to the BMC 102.

Before the end of the boot operation 202, the BIOS 108 can send (at 210) a disable access indication to the BMC 102, to cause access of the hierarchical structure of data elements 106 to be disabled by entities in the computer system 100. The disable access indication can be in the form of a command, an information element, a signal, and so forth. In response to the disable access indication 210, the BMC 102 can disable (at 212) access of the hierarchical structure of data elements 106.

Once access of the hierarchical structure of data elements 106 is disabled, no entity in the computer system 100 can read or write the hierarchical structure of data elements 106 until the computer system 100 is reset and the next boot operation is performed. Thus, after the boot operation 202, even if the BIOS 108, the OS 112, or another program were to be compromised, the hierarchical structure of data elements 106 stored in the BMC 102 can remain secure from unauthorized access.

In this manner, the BIOS 108 can ensure that the hierarchical structure of data elements 106 presented by the virtual I/O device 104 is available to just the BIOS 108 during a boot operation, which increases the security associated with writing and reading configuration settings of the BMC 102.

At some point, a secure connection to the virtual I/O device 104 from the management program 116 can be established.

The management program 116 can read (at 214), using the interface 107, the configuration setting written by the BIOS 108 to the given data element of the hierarchical structure of data elements 106. Note that this reading by the management program 116 can occur outside of the time of the boot operation 202. In some examples, the management program 116 can poll (e.g., on a periodic basis) the hierarchical structure of data elements 106 so that any changed configuration setting(s) can be detected by the management program 116. In other examples, the management program 116 can subscribe to events from the BMC 102, which can notify the management program 116 of certain events, including changes to configuration settings.

The management program 116 modifies (at 216) the configuration setting read by the management program 116, such as in response to a user input or input from another source. The management program 116 then writes (at 218), using the interface 107, the modified configuration setting to the given data element of the hierarchical structure of data elements 106.

Subsequently, the computer system 100 may be reset (such as based on an indication from the management program 116), such that the computer system 100 performs a next boot operation 220.

During the next boot operation 220, the BIOS 108 reads (at 222) the hierarchical structure of data elements 106 (including the modified configuration setting as modified by the management program 116, which is stored in the given data element of the hierarchical structure of data elements 106). The BIOS 108 then performs (at 224) a configuration operation using the information in the hierarchical structure of data elements 106, including the modified configuration setting.

Subsequently, the BIOS 108 can write further information to the hierarchical structure of data elements 106 to be read by the management program 116, and the process can continue until all configuration operations have completed (e.g., the tasks performed in the boot operation 202 can be re-iterated in each successive boot operation).

Although FIG. 2 shows an example regarding how writes and reads of configuration settings in the hierarchical structure of data elements 106 can be used to perform a configuration change of the computer system 100, it is noted that in other examples, other configuration techniques can be employed. For example, a configuration change of the computer system 100 can be accomplished without the involvement of the management program 116 executed by the remote computer 114. Also, a configuration change can be performed in one boot operation, instead of in multiple boot operations as shown in FIG. 2.

Figure 3:
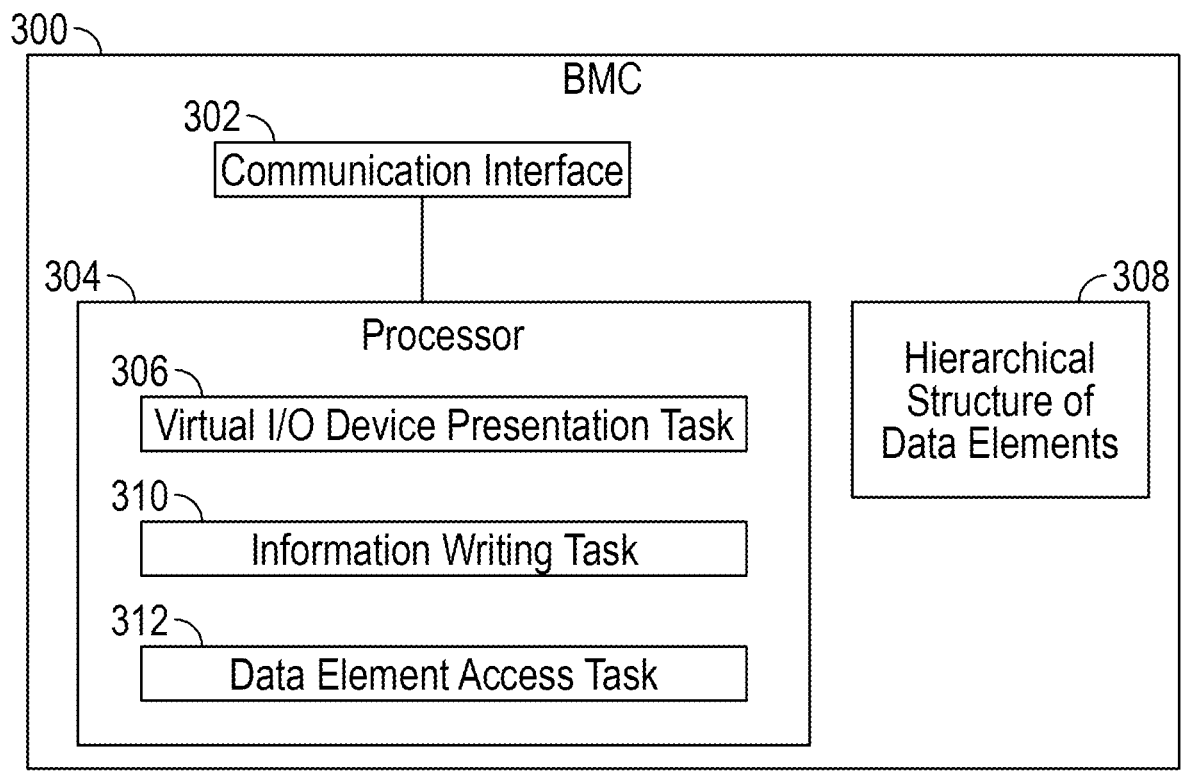
FIG. 3 is a block diagram of a BMC according to some examples.

FIG. 3 is a block diagram of a BMC 300 according to some examples. The BMC includes a communication interface 302 (e.g., the communication module 126 of FIG. 1) to communicate with a device (e.g., the remote computer 114 of FIG. 1) over a network (e.g., the network 117 of FIG. 1).

The BMC 300 includes a processor 304 that is able to perform various tasks. The tasks performed by the processor 304 can be based on machine-readable instructions (e.g., 124 in FIG. 1) executing on the processor 304.

The tasks include a virtual I/O device presentation task 306 to present a virtual I/O device that stores a hierarchical structure of data elements 308. In some examples, presenting the virtual I/O device includes presenting a virtual USB device, a virtual PCIe device, or another type of virtual I/O device. The virtual I/O device may be a virtual mass storage device in some examples.

The tasks include an information writing task 310 to write information in a first data element of the hierarchical structure of data elements 308, where the information relates to a configuration of a computer system to be managed by the BMC 300 (the BMC 300 manages the configuration of the computer system based on providing access to configuration data elements of the hierarchical structure of data elements 308 by various entities, such as a BIOS and the management program in the remote computer). The writing of the information in the first data element can be responsive to a write by a BIOS. Alternatively or additionally, the writing of the information in the first data element can be responsive to a write from a management program (e.g., 116 in FIG. 1). For example, the management program can modify a configuration setting written to the first data element by the BIOS, and the management program can write the modified configuration setting to the first data element.

The tasks include a data element access task 312 to receive an access of the first data element during a configuration stage of the computer system. For example, the BIOS may read the modified configuration setting in the first data element.

In some examples, the processor 304 can disable access of the hierarchical structure of data elements 308 to prevent access of the hierarchical structure of data elements 308 after a boot operation is finished. The disabling of the access of the hierarchical structure of data elements 308 can be in response to a disable command from the BIOS, or can be performed at the initiative of the BMC 300.

Figure 4:
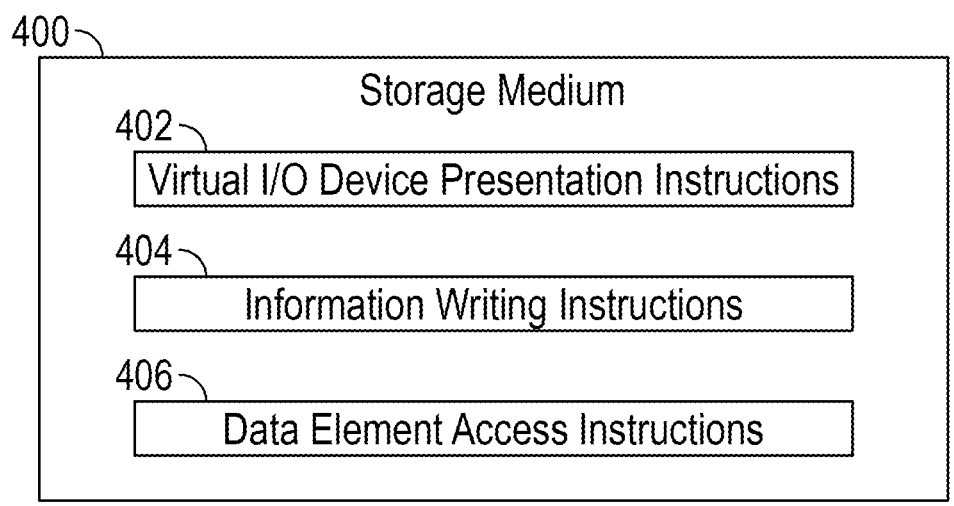
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a BMC to perform various tasks.

The machine-readable instructions include virtual I/O device presentation instructions 402 to present a virtual I/O device that stores a hierarchical structure of data elements. In some examples, the hierarchical structure of data elements can be arranged as a file system that can be accessed by an entity of a computer system using read and write commands.

The machine-readable instructions include information writing instructions 404 to write, in response to an indication from firmware of the computer system, information in a first data element of the hierarchical structure of data elements, the information relating to a configuration of the computer system to be managed by the BMC.

The machine-readable instructions include data element access instructions 406 to receive an access of the first data element during a configuration stage of the computer system.

In some examples, the machine-readable instructions can modify, in response to an indication from a management program, the information in the first data element, to cause the first data element to store modified information, and can output the modified information to the firmware in response to the access of the first data element during the configuration stage.

In some examples, the virtual I/O device is accessible by read and write commands from the firmware, and the machine-readable instructions upon execution cause the BMC to present an interface to allow the management program, when executed in a remote computer coupled to the BMC over a network, to access the hierarchical structure of data elements.

Figure 5:
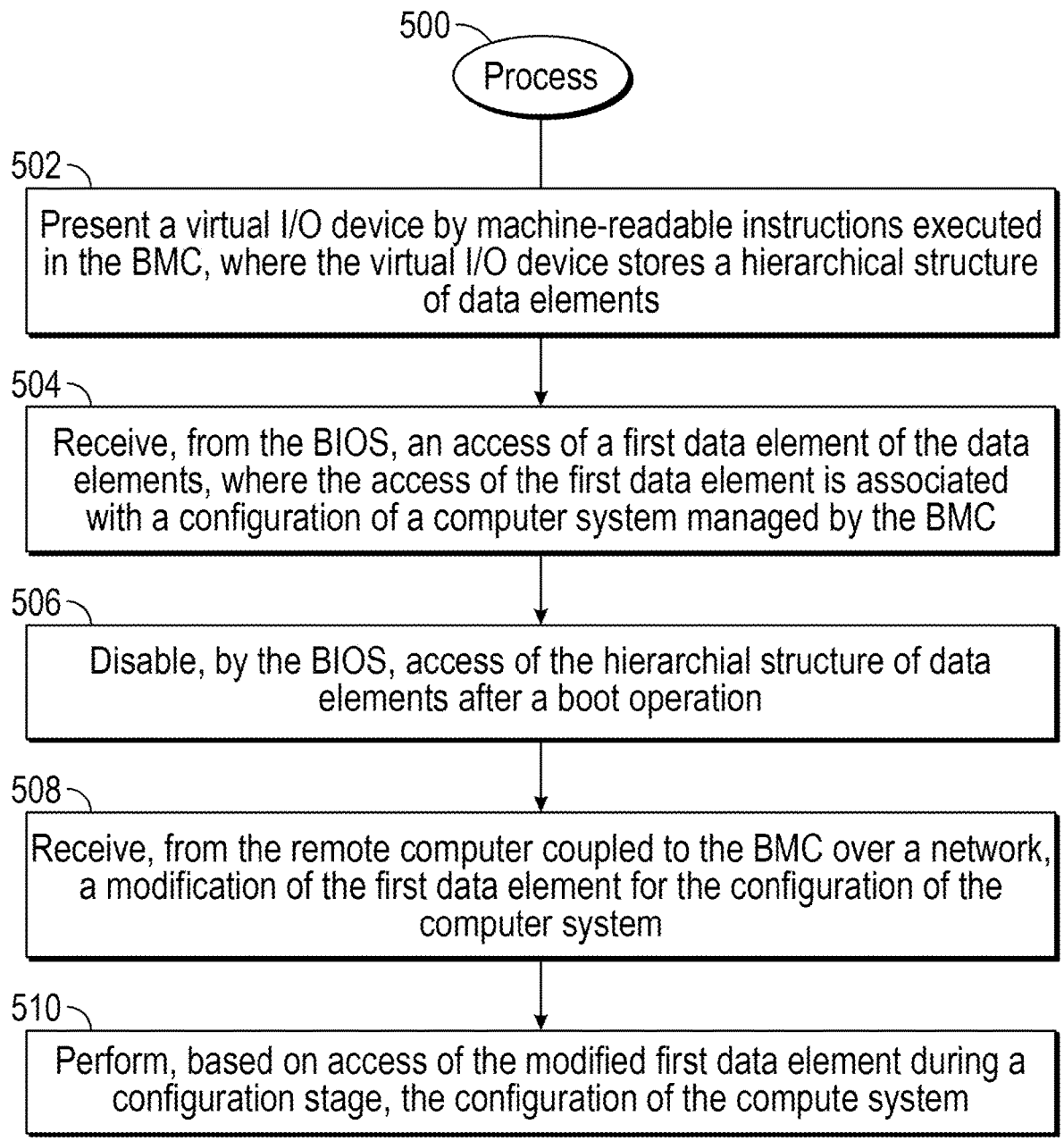
FIG. 5 is a flow diagram of a process according to some examples.

FIG. 5 is a flow diagram of a process 500 according to some examples. The process 500 can be performed by a BMC.

The process 500 includes presenting (at 502) a virtual I/O device by machine-readable instructions executed in the BMC, where the virtual I/O device stores a hierarchical structure of data elements. The hierarchical structure of data elements can be accessible by a BIOS in a computer system using read and write commands to the virtual I/O device, and can be accessible by a management program in a remote computer using an interface such as a RESTful interface used in Redfish management operations.

The process 500 includes receiving (at 504), from the BIOS, an access of a first data element of the data elements, where the access of the first data element is associated with a configuration of a computer system managed by the BMC. For example, the BIOS can write a configuration setting to the first data element in response to an event indicating that a configuration change should be performed.

The process 500 includes disabling (at 506), by the BIOS, access of the hierarchical structure of data elements by entities in the computer after a boot operation. For example, the BIOS 108 can send a disable access indication to the BMC to cause access of the hierarchical structure of data elements to be disabled.

The process 500 includes receiving (at 508), from the remote computer coupled to the BMC over a network, a modification of the first data element for the configuration of the computer system. For example, the management program in the remote computer can modify a configuration setting written to the first data element by the BIOS.

The process 500 includes performing (at 510), based on access of the modified first data element during a configuration stage, the configuration of the computer system. For example, the configuration performed at 510 can be during a next boot operation following a reset of the computer system, and can be performed by the BIOS based on the modified first data element.

A storage medium (e.g., 118 or 122 in FIG. 1, or 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A baseboard management controller (BMC) comprising:
   a communication interface to communicate with a device over a network; and
   a processor to:
      present a virtual input/output (I/O) device that stores a hierarchical structure of data elements, wherein the presenting of the virtual I/O device that stores the hierarchical structure of data elements comprises presenting a virtual storage device that stores the hierarchical structure of data elements;
      write information in a first data element of the data elements, the information relating to a configuration of a computer system to be managed by the BMC; and receive an access of the first data element during a configuration stage of the computer system, wherein the access of the first data element comprises a read access or write access by a Basic Input/Output System (BIOS).

2. The BMC of claim 1, wherein the configuration stage is part of a boot operation performed by the BIOS.

3. The BMC of claim 2, wherein the processor is to disable access of the hierarchical structure of data elements after the boot operation.

4. The BMC of claim 1, wherein the writing of the information in the first data element is responsive to an operation from the BIOS running in the computer system, the operation from the BIOS comprising a configuration operation that configures a setting of the computer system.

5. The BMC of claim 4, wherein the setting configured by the configuration operation is selected from among a setting of the BIOS, a boot order of storage devices of the computer system, a setting of a secure cryptoprocessor, and a setting of a user input device.

6. The BMC of claim 4, wherein the BMC is to expose a portion of the hierarchical structure of data elements to a remote computer.

7. The BMC of claim 1, wherein the writing of the information in the first data element is by a management program in a remote computer coupled over the network to the BMC, wherein the writing of the information in the first data element is part of a configuration operation to configure a setting of the computer system.

8. The BMC of claim 1, wherein the data elements of the hierarchical structure of data elements are referred to by Uniform Resource Identifiers (URIs).

9. The BMC of claim 1, wherein the hierarchical structure of data elements presented by the virtual I/O device comprises a file system accessible by an entity in the computer system.

10. The BMC of claim 1, wherein an interface between the BIOS and the BMC is secured by a security protocol.

11. The BMC of claim 1, wherein the virtual I/O device is a virtual Universal Serial Bus (USB) device.

12. The BMC of claim 1, wherein the data elements in the hierarchical structure of data elements comprise information of settings of respective resources of the computer system, and wherein a read access of the first data element by the BIOS is for configuring, during the configuration stage, of a respective setting of a resource of the computer system.

13. The BMC of claim 12, wherein the respective setting of the resource comprises a boot order of storage devices.

14. A non-transitory machine-readable storage medium comprising instructions that upon execution cause a baseboard management controller (BMC) to:
present a virtual input/output (I/O) device that stores a hierarchical structure of data elements;
write information in a first data element of the data elements, the information relating to a setting of a first resource in a computer system to be managed by the BMC;
receive a read access of the first data element by a Basic Input/Output System (BIOS) during a configuration stage of the computer system, the configuration stage to configure, by the BIOS, the setting of the first resource in the computer system; and
receive a write access from the BIOS of a second data element of the data elements, the write access to modify a setting of a second resource in the computer system.

15. The non-transitory machine-readable storage medium of claim 14, wherein the writing of the information in the first data element is responsive to an indication from a management program that executes in a remote computer that is remote from the computer system.

16. The non-transitory machine-readable storage medium of claim 15, wherein the virtual I/O device is accessible by read and write commands from the BIOS, and wherein the instructions upon execution cause the BMC to:
present an interface to allow the management program, when executed in the remote computer coupled to the BMC over a network, to access the hierarchical structure of data elements.

17. The non-transitory machine-readable storage medium of claim 14, wherein the instructions upon execution cause the BMC to:
responsive to an indication from the BIOS, disable access of the hierarchical structure of data elements to render the hierarchical structure of data elements inaccessible after a boot operation performed by the BIOS, wherein the configuration stage is part of the boot operation.

18. A method of a baseboard management controller (BMC), comprising:
presenting a virtual input/output (I/O) device by machine-readable instructions executed in the BMC, the virtual I/O device storing a hierarchical structure of data elements;
receiving, from a Basic Input/Output System (BIOS), an access of a first data element of the data elements, the access of the first data element associated with a configuration of a computer system managed by the BMC;
disabling, by the BIOS, access of the hierarchical structure of data elements to entities in the computer system after a boot operation;
receiving, from a remote computer coupled to the BMC over a network, a modification of the first data element for the configuration of the computer system; and
performing, based on access of the modified first data element during a configuration stage, the configuration of the computer system.

19. The method of claim 18, wherein the modification of the first data element by the remote computer is through an interface associated with the hierarchical structure of data elements.

20. The method of claim 18, wherein the configuration of the computer system is performed by the BIOS based on the BIOS reading the modified first data element.

* * * * *